US012713474B2

(12) United States Patent
Murthy et al.

(10) Patent No.: US 12,713,474 B2
(45) Date of Patent: Aug. 18, 2026

(54) END-TO-END RESOURCE PRIORITIZATION FOR A MULTIMEDIA PRIORITY SERVICE ON-DEMAND SERVICE USER

(71) Applicant: Mavenir Systems, Inc., Richardson, TX (US)

(72) Inventors: Veena Murthy, Allen, TX (US); Tamanna Jindal, McKinney, TX (US)

(73) Assignee: Mavenir Systems, Inc., Richardson, TX (US)

(*) Notice: Subject to any disclaimer, the term of this patent is extended or adjusted under 35 U.S.C. 154(b) by 285 days.

(21) Appl. No.: 18/482,232

(22) Filed: Oct. 6, 2023

(65) Prior Publication Data

US 2024/0129963 A1 Apr. 18, 2024

Related U.S. Application Data

(60) Provisional application No. 63/415,687, filed on Oct. 13, 2022.

(51) Int. Cl.
*H04W 76/10* (2018.01)
*H04W 76/30* (2018.01)

(52) U.S. Cl.
CPC ........... *H04W 76/10* (2018.02); *H04W 76/30* (2018.02)

(58) Field of Classification Search
CPC ............... H04L 65/1069; H04L 63/102; H04L 65/1016; H04L 65/1073; H04L 65/80;
(Continued)

(56) References Cited

U.S. PATENT DOCUMENTS 9,554,401 B2 * 1/2017 Rasanen ............. H04L 65/1096
11,706,705 B2 * 7/2023 Talebi Fard .......... H04W 88/18 370/329

(Continued)

OTHER PUBLICATIONS

3GPP TR 22.953, v.17.0.0"3rd Generation Partnership Project: Technical Specification Group Services and System Aspects; Multimedia Priority Service Feasibility Study (Release 17);" Dec. 2019.

(Continued)

*Primary Examiner* — Matthew C Sams
(74) *Attorney, Agent, or Firm* — Ruggiero McAllister & McMahon LLC

(57) ABSTRACT

A method for facilitating an on-demand multimedia priority service (MPS) for a data transport services (DTS) session to receive end to end prioritization within 5G Core (5GC) and radio access network (RAN) is provided. The method includes: propagating an MPS On-Demand indication to 5GC network functions and RAN via (a) Policy Control Function sending an MPS On-Demand indication to Session Management Function (SMF) when a authorized user initiates such a service usage, (b) SMF recording the on session demand status and sending the MPS On-Demand indication to an Access and Mobility Management Function (AMF), and (c) AMF, in response to receiving the MPS On-Demand indication, upgrading the user for multimedia priority services in the 5G core based on policy, and sending to user equipment (UE), an MPS indicator in downlink Non-Access Stratum (NAS) messaging to indicate that the UE may use MPS access identity to receive radio access prioritization.

9 Claims, 2 Drawing Sheets

(58) Field of Classification Search
CPC . H04L 63/0853; H04L 63/101; H04L 63/105; H04L 67/14; H04L 69/24; H04L 47/10; H04L 47/70; H04L 47/805; H04L 47/808; H04L 47/824; H04L 63/10; H04L 65/1104; H04L 67/141; H04L 67/306; H04L 67/62; H04W 76/10; H04W 76/12; H04W 12/08; H04W 28/0268; H04W 4/90; H04W 40/02; H04W 40/12; H04W 48/18; H04W 80/02; H04W 88/18; H04W 12/06; H04W 36/04; H04W 4/06; H04W 4/50; H04W 60/00; H04W 60/005; H04W 60/04; H04W 76/19; H04W 76/27; H04W 76/30; H04W 8/08; H04W 8/18; H04W 8/20; H04W 88/14; H04M 15/66
See application file for complete search history.

(56) References Cited

U.S. PATENT DOCUMENTS 12,316,641 B2 * 5/2025 Bharatia ................. H04L 67/14
12,363,193 B2 * 7/2025 Talebi Fard .......... H04W 76/10
2010/0316063 A1 * 12/2010 Zhou ..................... H04L 47/824 455/452.2
2012/0167179 A1 * 6/2012 Evans ..................... H04L 67/62 726/4
2013/0273876 A1 * 10/2013 Rasanen ............. H04L 65/1016 455/404.1
2021/0410059 A1 * 12/2021 Talebi Fard .......... H04W 40/02
2022/0159518 A1 * 5/2022 Da Silva ............... H04W 76/30
2023/0232207 A1 * 7/2023 Nayak ..................... H04W 4/06 370/329
2023/0239667 A1 * 7/2023 Suh ..................... H04W 60/005
2023/0412608 A1 * 12/2023 Vaishnavi ............. H04L 63/102
2024/0137366 A1 * 4/2024 Bharatia ................. H04L 67/14

OTHER PUBLICATIONS

3GPP TS 23.203, v.17.2.0"3rd Generation Partnership Project: Technical Specification Group Services and System Aspects; Policy and Charging Control Architecture (Release 17)" ; Dec. 2021.

Extended European Search Report and Written Opinion for corresponding European application 23202957.9, 10 pages dated Feb. 20, 2024.

* cited by examiner

END-TO-END RESOURCE PRIORITIZATION FOR A MULTIMEDIA PRIORITY SERVICE ON-DEMAND SERVICE USER

CROSS-REFERENCE TO RELATED APPLICATIONS

The present application claims priority to U.S. Provisional Patent Application No. 63/415,687 filed on Oct. 13, 2022, the entirety of which is incorporated by reference herein.

BACKGROUND OF THE DISCLOSURE

1. Field of the Disclosure

The present disclosure relates to mobile communications, and more particularly, to an on-demand invocation of a multimedia priority service (MPS) during an emergency situation.

2. Description of the Related Art

The approaches described in this section are approaches that could be pursued, but not necessarily approaches that have been previously conceived or pursued. Therefore, the approaches described in this section may not be prior art to the claims in this application and are not admitted prior art by inclusion in this section.

In telecommunications, 5G is a fifth-generation technology standard for broadband cellular networks. A multimedia priority service (MPS) supported by a 5G system (5GS) allows a user priority access to 5GS resources in situations such as during congestion, creating the ability to deliver or complete sessions of a high priority nature. The user may be government-authorized personnel, an emergency management official and/or other authorized user.

In the event of a failure of MPS authorized user equipment (UE) during an emergency situation or a governmental operation/mission, an authorized MPS user may need to use UE without an MPS subscription, i.e., a public UE, to request MPS for data transport services (DTS). Once the user is verified by the MPS service provider, for example, via credential authentication at a well-defined uniform resource locator (URL) of which the user is aware, the MPS service provider's Application Function (AF) triggers 5GS to upgrade the user's data transport flows to MPS priority.

Once an MPS session is established, priority treatment is provided for the media flows or a subset of the media flows, and the user is able to support different communication applications (e.g., data, streaming video, email, messages) over the MPS for the DTS session. However, the user does not receive access/signaling/mobility service prioritization as the UE, radio access network (RAN) and 5G core (5GC) network functions (NFs), such as the Access and Mobility Management Function (AMF) and the Session Management Function (SMF), are unaware of the user's on-demand MPS authorization status.

For an MPS on-demand user, the Policy Control Function (PCF) receives an "MPS" indication in messaging from the AF when a user is authorized by an MPS service provider to enforce appropriate quality of service (QoS) for prioritized media flows. However, the 3$^{rd}$ Generation Partnership Project (3GPP) does not provide any explicit procedure of conveying this MPS indication from the PCF to other 5GC NFs such as the AMF, the SMF and User Plane Function (UPF), and subsequently from the AMF to the UE. As a result, the SMF and UPF are unaware that an MPS Packet Data Unit (PDU) session in use by an on-demand MPS user in the event session level resource prioritization is applicable during congestion, the AMF is unaware of the on-demand MPS user's need for MPS prioritization for access and mobility events, and consequently, the user equipment (UE) is also unaware of an upgraded MPS status.

Lack of end-to-end prioritization for an on-demand MPS user leads to the following problems:

(a) In the event of radio signaling connection loss/release for an on-demand MPS user, a non-MPS subscribed device/public-UE used by the user is unaware that it should be requesting priority access.

(b) An authorized on-demand MPS user who managed to gain 5G service access to successfully setup an MPS for a data transport session during an active disaster or overload situation is put at a severe disadvantage in the event of the non-MPS UE losing radio connection to the RAN and getting moved to an IDLE state. The non-MPS UE may not be able to successfully bring up the radio connection to the RAN to continue using the authorized MPS session given that the non-MPS UE was never informed that it has been temporarily upgraded to MPS on-demand status, and thereby does not indicate access priority request to the RAN during Radio Resource Control (RRC) connection re-establishment. The RAN therefore does not give the non-MPS UE any priority over others during a network congestion/overload in a disaster situation when other devices are also attempting to gain network connectivity at the same time.

SUMMARY OF THE DISCLOSURE

The present document discloses a method for facilitating an on-demand multimedia priority service (MPS) for a data transport services (DTS) session to receive end to end prioritization within 5G Core (5GC) and radio access network (RAN). The method includes propagating an MPS On-Demand indication to 5GC network functions and RAN via (a) Policy Control Function sending an MPS On-Demand indication to Session Management Function (SMF) when a authorized user initiates such a service usage, (b) SMF recording the on session demand status and sending the MPS On-Demand indication to an Access and Mobility Management Function (AMF), and (c) AMF, in response to receiving the MPS On-Demand indication, upgrading the user for multimedia priority services in the 5G core for signaling and mobility, based on policy, and sending to user equipment (UE), an MPS indicator in downlink Non-Access Stratum (NAS) messaging to indicate that the UE may use MPS access identity to receive radio access prioritization.

BRIEF DESCRIPTION OF THE DRAWINGS

A component or a feature that is common to more than one drawing is indicated with the same reference number in each of the drawings.

DESCRIPTION OF THE DISCLOSURE

Pursuant to the technique disclosed herein, an authorized MPS user may use an MPS-subscribed device or a non-MPS subscribed device to obtain priority services from a network. When the authorized MPS user initiates a request for services using a UE with an MPS subscription, prioritized radio and signaling support is provided by access and core network elements from initial access to the network with the UE triggering request the request. An authorized MPS user using UE with non-MPS subscription can invoke MPS for DTS and receive prioritized media flows once authorized by an MPS Service Provider.

Figure 1:
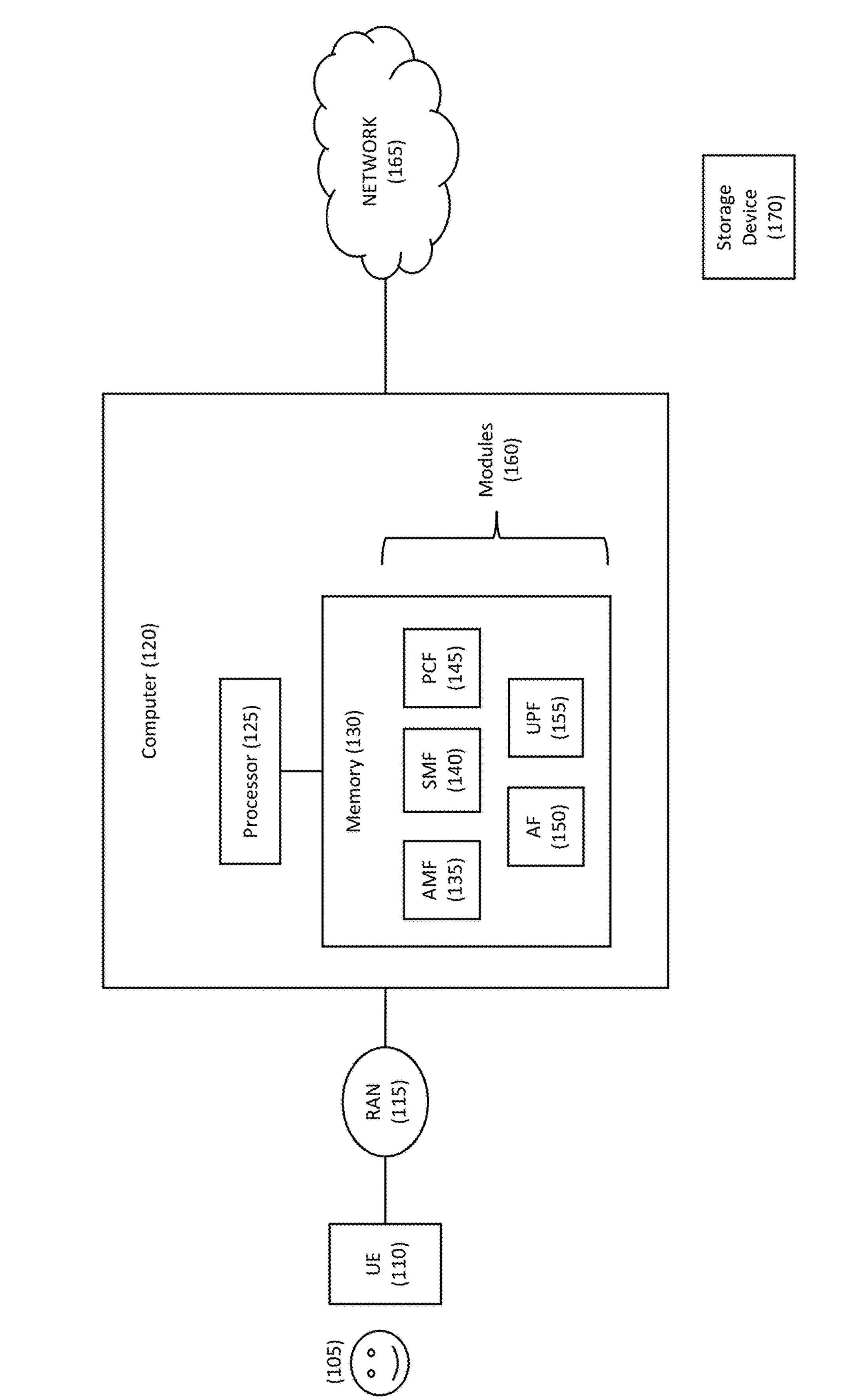
FIG. 1 is a block diagram of a system that provides end-to-end resource prioritization for a multimedia service on-demand service user.

FIG. 1 is a block diagram of a system 100 that provides end-to-end resource prioritization for a multimedia service on-demand service user, i.e., user 105. System 100 includes UE 110, a RAN 115, a computer 120, and a data network, namely network 165. UE 110 is communicatively coupled to RAN 115, which is communicatively coupled to computer 120, which is communicatively coupled to network 165.

UE 110 is a communication device such as a cell phone, and is being used by user 105. In the industry, user 105 is also known as "a subscriber".

Computer 120 includes a processor 125 and a memory 130 that is operationally coupled to processor 125.

Processor 125 is an electronic device configured of logic circuitry that responds to and executes instructions.

Memory 130 is a tangible, non-transitory, computer-readable storage device encoded with a computer program. In this regard, memory 130 stores data and instructions, i.e., program code, which are readable and executable by processor 125 for controlling operations of processor 125. Memory 130 may be implemented in a random access memory (RAM), a hard drive, a read only memory (ROM), or a combination thereof.

Memory 130 includes:

- an Access and Mobility Management Function (AMF) 135;
- a Session Management Function (SMF) 140;
- a Policy Control Function (PCF) 145;
- an Application Function (AF) 150; and
- a User Plane Function (UPF) 155.

In the present document, AMF 135, SMF 140, PCF 145, AF 150 and UPF 155 are collectively referred to as modules 160, and although we describe operations being performed by modules 160, the operations are actually being performed by processor 125.

While modules 160 are indicated as being already loaded into memory 130, they may be configured on a storage device 170 for subsequent loading into memory 130. Storage device 170 is a tangible, non-transitory, computer-readable storage device that stores modules 160 thereon. Examples of storage device 170 include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random access memory, and (i) an electronic storage device coupled to computer 120.

Although computer 120 is represented herein as a standalone device, it is not limited to such, but instead can be coupled to other devices (not shown) in a distributed processing system, and modules 160 and their functionalities, may be distributed among the other devices.

Figure 2:
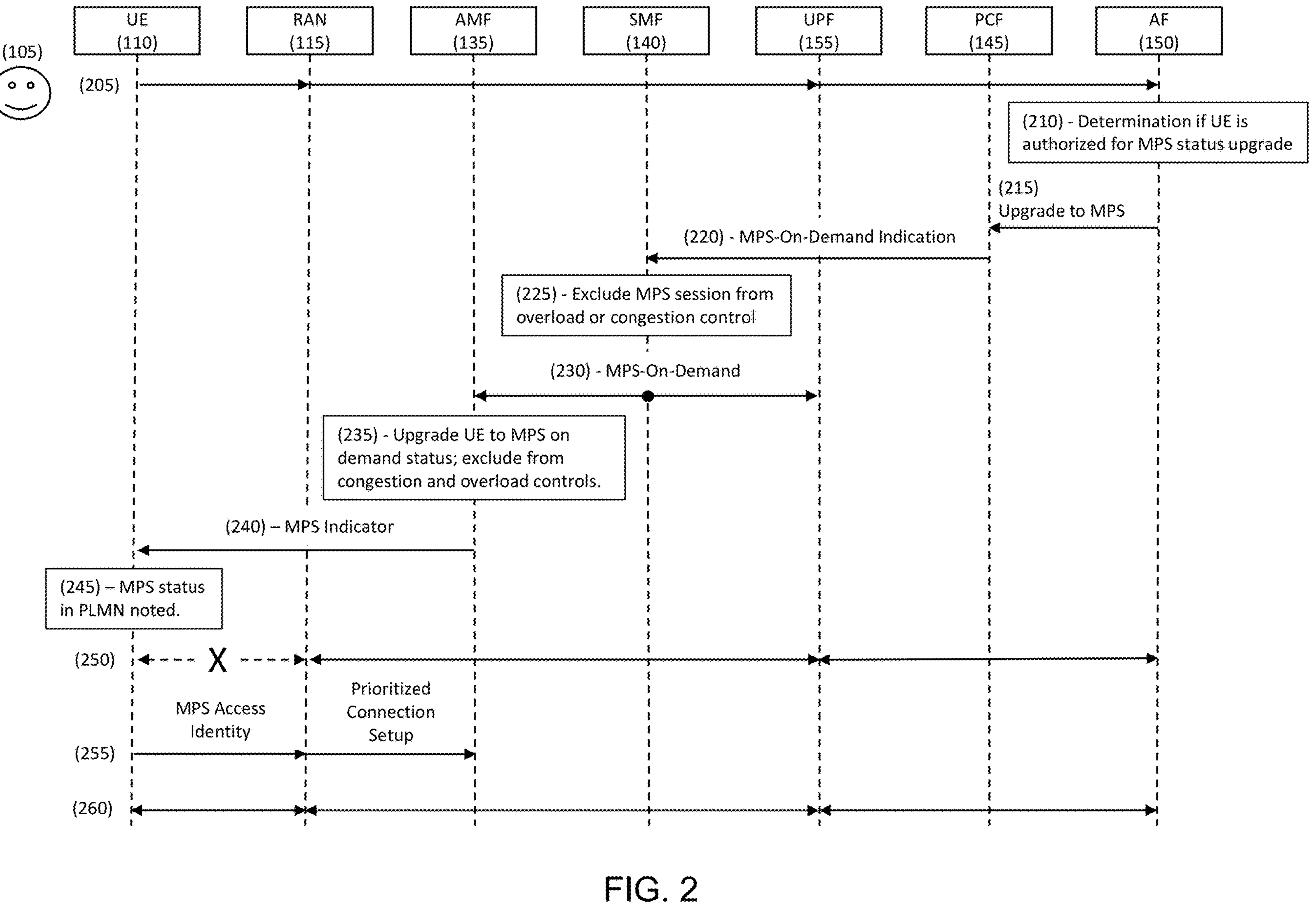
FIG. 2 is a signal flow diagram for the system of FIG. 1 to provide end-to-end resource prioritization for a multimedia service on-demand service user during a session.

FIG. 2 is a signal flow diagram for system 100 to provide end-to-end resource prioritization for a multimedia service on-demand service user during a session. In brief, system 100 utilizes an MPS-On-Demand indication for 5GC NFs to communicate an MPS-On-Demand status for an MPS service user, e.g., user 105, who is authorized to gain on-demand MPS access and prioritization.

In operation 205, user 105, through UE 110, requests on-demand MPS for Data Transport Services (DTS), and accordingly, UE 110 transmits a corresponding request to RAN 115, which, in turn, forwards the request to UPF 155 and AF 150.

In operation 210, AF 150 determines whether UE 110 is authorized for MPS status upgrade. The AF may consult a roster or a database, which authorizes the user's request for on-demand priority services.

In operation 215, when AF 150 has authorized the MPS status upgrade, AF 150 sends an upgrade to MPS message to PCF 145.

In operation 220, PCF 145 sends an MPS-On-Demand Indication to SMF 140 to indicate the session's MPS-On-Demand status, in addition to providing the required policy and QoS requirements for the session.

In operation 225, SMF 140 records the MPS-On-Demand Indication for the PDU session, and uses it thereafter to exclude the PDU session from congestion controls, or any other resource allocation contentions, that requires throttling, revoking or otherwise reducing services offered to non-MPS sessions.

In operation 230, SMF 140 passes the MPS-On-Demand Indication to AMF 135 and UPF 155 for user 105 indicating the PDU session is subject to MPS on-demand service upgrade. AMF 135 and UPF 155 record the MPS on-demand status of the PDU session, and thereafter exclude the PDU session from congestion controls, or any other resource allocation contentions that require throttling, revoking or otherwise reducing services offered to non-MPS sessions.

In operation 235, optionally if operator policy indicates it, AMF 135 shall trigger release of any non-MPS sessions if active, while upgrading UE 110 to an MPS-On-Demand Subscriber status during an active disaster situation. For example, operator policy is setup such that it dictates that an MPS-on-demand session may trigger user 105 to be upgraded to MPS status provided only the MPS for DTS session is allowed to receive the MPS service. This means if user 105 has any other PDU sessions active at the time of receiving MPS-on-Demand indication, AMF 135 shall trigger release of those PDU sessions that are not implicitly assigned MPS priority. Additionally, AMF 135 uses the MPS-On-Demand subscriber status to apply exclusions from Non-Access Stratum (NAS) congestion control, and for prioritization of all mobility, and signaling for the on-demand MPS subscriber, i.e., user 105.

In operation 240, AMF 135 sends MPS indicator to UE 110 in a subsequent downlink NAS messaging via RAN 115 to indicate UE 110 may use MPS priority in the current Public Land Mobile Network (PLMN). For example, AMF 135 sets the MPS indicator in the downlink NAS Registration Accept message during a mobility event. Whereas user 105 is an MPS-On-Demand subscriber, when AMF 135 sends "MPS indicator" to UE 110 in downlink NAS Registration Accept message during the next mobility event, it informs UE 110 that in the event that the radio connection between UE 110 and RAN 115 is lost, and UE 110 wants to re-connect, UE 110 may send an MPS Priority radio access request to RAN 115, as indicated by operations 250, 255, 260.

In operation 245, UE 110 notes its MPS status in the current PLMN, allowing UE 110 to use priority access identity through RAN 115 as noted in operation 255.

Operation 250 represents a loss of radio connection between UE 110 and RAN 115. UE 110 moves to an idle state. The radio resources between UE 110 and RAN 115, signaling resources between RAN 115 and AMF 135, and user plane resources between RAN 115 and UPF 155 are released as a result, thereby affecting user 105's prioritized data communication with network 165.

Assume that UE 110 wishes to re-connect to RAN 115 to continue receiving on demand MPS services.

In operation 255, UE 110 includes MPS Access Identity in the RRC messaging with RAN 115. Accordingly, RAN 115 proceeds with a prioritized connection setup, passing on the MPS indication to AMF 135.

In operation 260, after the connection is re-setup, user 105 and UE 110 engage in priority data communications through network 165.

Once the MPS session terminates, AMF 135, based on operatory policy, shall revoke the MPS-On-Demand status and shall no longer provide priority services to UE 110. Through this mechanism the MPS service provider ensures that UE 110 is truly granted an on-demand priority status only as long as the MPS authorized services are in use.

Thus, user 105, i.e., an authorized MPS for DTS service user that is granted MPS status on-demand shall be upgraded to receive end-to-end priority treatment while the authorized MPS services are in use, and removed once the MPS session terminates, revoking the priority treatment.

Thus, in review, computer 120 performs a method for facilitating an on-demand MPS for a DTS session in RAN 115. In this regard, (a) in operation 220, SMF 140 receives an MPS On-Demand indication, (b) in operation 230, SMF 140 sends the MPS On-Demand indication to AMF 135, and (c) in operation 240, AMF 135, in response to receiving the MPS On-Demand indication, sends, to UE 110, an MPS indicator in downlink NAS messaging to indicate that UE 110 may use MPS.

In operation 225, SMF 140 excludes the session from congestion controls that reduce services offered to non-MPS sessions.

In operation 230, SMF 140 also sends the MPS On-Demand indication to UPF 155, thus informing UPF 155 of the session undergoing MPS on-demand upgrade.

In operation 235, AMF 135, in response to receiving the MPS On-Demand indication, also triggers a release of a non-MPS session.

In operation 255, UE 110, in response to a loss of communication with RAN 115, includes an MPS Access Identity in RRC messaging with RAN 115, and RAN 115, in response to receiving the MPS Access Identity, proceeds with a prioritized connection setup for UE 110.

The techniques described herein are exemplary, and should not be construed as implying any limitation on the present disclosure. Various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations, components, or groups thereof. The terms "a" and "an" are indefinite articles, and as such, do not preclude embodiments having pluralities of articles.

What is claimed is:

1. A method for facilitating an on-demand multimedia priority service (MPS) for a data transport services (DTS) session in a radio access network (RAN), comprising:

a Policy Control Function (PCF) sending and a Session Management Function (SMF) receiving an MPS On-Demand indication following an authorized MPS user service grant; and sending said MPS On-Demand indication from said SMF to an Access and Mobility Management Function (AMF), wherein said AMF, in response to receiving said MPS On-Demand indication, sends, to user equipment (UE), an MPS indicator in downlink Non-Access Stratum (NAS) messaging to indicate said UE may use priority access for radios;

wherein said SMF records session upgrade to MPS on demand status, and thereafter excludes said session from congestion controls that reduce services offered to non-MPS sessions; and wherein said AMF, in response to receiving said MPS On-Demand indication, performs user upgrade to MPS status based on local policy, and also triggers release of non-MPS session(s).

2. The method of claim 1, wherein said SMF also sends said MPS On-Demand indication to a User Plane Function (UPF), thus informing said UPF of said session undergoing MPS on-demand upgrade, and wherein said UPF records session upgrade to MPS on demand status, and thereafter excludes said session from any congestion controls that result in reduced services offered to non-MPS sessions.

3. The method of claim 1, wherein said UE, in response to a loss of communication with said RAN, includes an MPS Access Identity in radio resource control (RRC) messaging with said RAN, and wherein said RAN, in response to receiving said MPS Access Identity, proceeds with a prioritized connection setup for said UE.

4. A system for facilitating an on-demand multimedia priority service (MPS) for a data transport services (DTS) session in a radio access network (RAN), comprising:

a processor; and a memory device that contains instructions that are readable by said processor to cause said processor to perform operations of:

sending, by a Policy Control Function (PCF) to a Session Management Function (SMF), an MPS On-Demand indication;

receiving, at said SMF, said MPS On-Demand indication; and sending said MPS On-Demand indication from said SMF to an Access and Mobility Management Function (AMF), wherein said AMF, in response to receiving said MPS On-Demand indication, sends, to user equipment (UE), an MPS indicator in downlink Non-Access Stratum (NAS) messaging to indicate said UE may use MPS;

wherein said SMF excludes said session from congestion controls that reduce services offered to non-MPS sessions; and wherein said AMF, in response to receiving said MPS On-Demand indication, also triggers a release of a non-MPS session.

5. The system of claim 4, wherein said SMF also sends said MPS On-Demand indication to a User Plane Function (UPF), thus informing said UPF of said session undergoing MPS on-demand upgrade.

6. The system of claim 4, wherein said UE, in response to a loss of communication with said RAN, includes an MPS Access Identity in radio resource control (RRC) messaging with said RAN, and wherein said RAN, in response to receiving said MPS Access Identity, proceeds with a prioritized connection setup for said UE.

7. A non-transitory storage device for facilitating an on-demand multimedia priority service (MPS) for a data transport services (DTS) session in a radio access network (RAN), wherein said storage device comprises instructions that are readable by a processor to cause said processor to perform operations of:

sending, by a Policy Control Function (PCF) to a Session Management Function (SMF), an MPS On-Demand indication;

receiving, at said SMF, an MPS On-Demand indication; and sending said MPS On-Demand indication from said SMF to an Access and Mobility Management Function (AMF), wherein said AMF, in response to receiving said MPS On-Demand indication, sends, to user equipment (UE), an MPS indicator in downlink Non-Access Stratum (NAS) messaging to indicate said UE may use MPS;

wherein said SMF excludes said session from congestion controls that reduce services offered to non-MPS sessions; and wherein said AMF, in response to receiving said MPS On-Demand indication, also triggers a release of a non-MPS session.

8. The storage device of claim 7, wherein said SMF also sends said MPS On-Demand indication to a User Plane Function (UPF), thus informing said UPF of said session undergoing MPS on-demand upgrade.

9. The storage device of claim 7, wherein said UE, in response to a loss of communication with said RAN, includes an MPS Access Identity in radio resource control (RRC) messaging with said RAN, and wherein said RAN, in response to receiving said MPS Access Identity, proceeds with a prioritized connection setup for said UE.

* * * * *